United States Patent

Bestenreiner et al.

[15] 3,641,895
[45] Feb. 15, 1972

[54] APPARATUS FOR PHOTOGRAPHIC COLOR RECORDING

[72] Inventors: Friedrich Bestenreiner, Grunwald, near Munich; Reinhold Demi, Munich, both of Germany

[73] Assignee: AGFA-Gevaert Aktiengesellschaft, Leverkusen, Germany

[22] Filed: June 3, 1969

[21] Appl. No.: 830,065

Related U.S. Application Data

[63] Continuation-in-part of Ser. No. 803,676, Mar. 3, 1969, abandoned.

[30] Foreign Application Priority Data

June 4, 1968   Germany......................P 17 72 568.7

[52] U.S. Cl..............................................95/12.21
[51] Int. Cl. .............................................G03b 33/14
[58] Field of Search....................95/12.2, 12.21; 355/33, 40

[56] References Cited

UNITED STATES PATENTS

| | | | |
|---|---|---|---|
| 1,746,584 | 2/1930 | Fournier | 355/33 X |
| 2,382,604 | 8/1945 | Capstaff | 355/33 |
| 3,408,143 | 10/1968 | Mueller | 355/40 |
| 3,478,661 | 11/1969 | Hecksher | 95/12.2 |
| 3,504,606 | 4/1970 | Macovski | 95/12.2 |

*Primary Examiner*—John M. Horan
*Attorney*—Michael S. Striker

[57] ABSTRACT

A photographic objective, in whose plane a set of filter strips associated with different colors is located, forms an image on a black and white film while the lens elements of a lenticular grating form images of the set of colored strips on the corresponding areas of the film. All strip images together form a strip grating on the film so that the image formed by the objective can be reproduced as a color picture by the diffraction orders of the strip grating.

14 Claims, 6 Drawing Figures

3,641,895

INVENTOR.
FRIEDRICH BESTENREINER
BY REINHOLD DEML

3,641,895

APPARATUS FOR PHOTOGRAPHIC COLOR RECORDING

REFERENCE TO A RELATED APPLICATION

The present application is a continuation-in-part application of our copending application Ser. No. 803,676, filed Mar. 3, 1969 entitled PHOTOGRAPHIC RECORDING AND REPRODUCING METHOD AND APPARATUS, now abandoned.

BACKGROUND OF THE INVENTION

Known arrangements for producing by means of a lenticular grating an image on a black and white film, and copying the black and white film to produce a color picture, have the disadvantage that due to difficulties in the coincidence of the lenticular grating, it is hardly possible to make good reproductions.

It is one object of the invention to overcome this disadvantage of the prior art, and provide a method and apparatus for recording on a black and white film by means of a lenticular grating in such a manner that the developed photographic film can be copied without difficulties.

Another object of the invention is to provide a new method of making color photographs, and an apparatus serving this purpose.

Another object of the invention is to produce photographic recordings on a photographic surface which include a grating whose diffraction orders are used for printing and reproduction of the picture on the photographic film.

With these objects in view, a method of the invention comprises the steps of forming a photographic object image on a photosensitive surface; and forming by a lenticular grating a plurality of color images of a set of filter strips associated with different color components of light on the photosensitive surface. In this manner, a strip grating composed of the images of the strips is recorded on the photosensitive surface, and the object image can be reproduced as a color picture by the diffraction orders of the strip grating. The filter strips which are associated with different color components have different widths, and are arranged in parallel positions, or in crossing angular positions. The strip grating on the photosensitive surface has a corresponding pattern with different grating constants or with different azimuth angles.

In order to obtain during the reproduction sufficient diffraction phenomena, the grating constants of the lenticular grating must be very high. Therefore, in addition to the known lenticular gratings consisting of synthetic materials, photographically made gratings are suitable, which are produced by exposing a corresponding sinusoidal strip grating on a suitable photosensitive layer which is then developed and rehalogenized. Lenticular gratings produced in this manner have not only an outer modulation, but also a periodic variation of the index of refraction, which has the effect of a cylinder lens when lighting of suitable intensity is used.

A black and white picture produced in accordance with the invention on a photosensitive surface can be developed in the usual manner, and printed as a contact print, or reproduced in any other manner without any noticeable loss on picture quality.

For this purpose, the images on photosensitive layer are illuminated by a source of light which is as point-shaped as possible, which is imaged by a condenser on an intermediate diaphragm. When the image-carrying photographic layer is disposed behind the condenser, pronounced diffraction effects take place, which can be either filtered, or used for producing a picture.

One embodiment of an apparatus for photographic color recording in accordance with the invention comprises an objective; a set of different filter strips associated with different color components located in the plane of the objective; a lenticular grating located between the objective and a photosensitive surface, covering the latter, and including a plurality of lens elements for projecting the filter rays associated with different color components onto correlated areas of the photosensitive surface, respectively. Each lens element forms an image of the set of strips on the respective area whereby all images of the strips form a grating on the entire photosensitive surface. This permits the reproduction and copying of the image formed by the objective on the photosensitive surface as a color picture by the diffraction orders of the grating.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
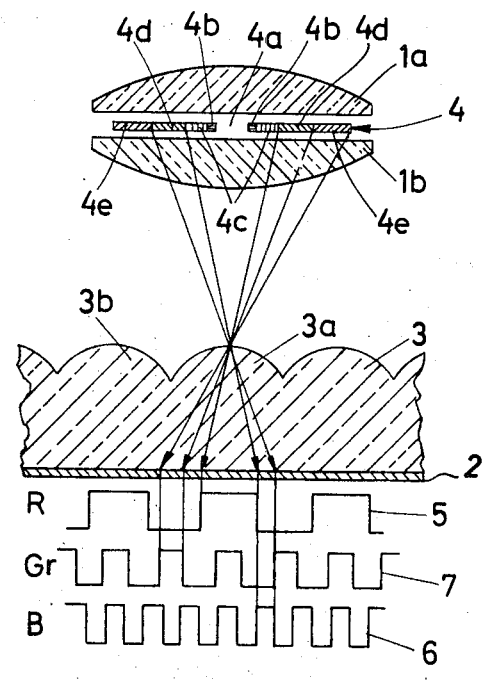
FIG. 1 is a fragmentary schematic sectional view illustrating a first embodiment of the invention by which colors are recorded by means of different grating constants, and including a diagram showing the distribution of the color components.
Figure 2:
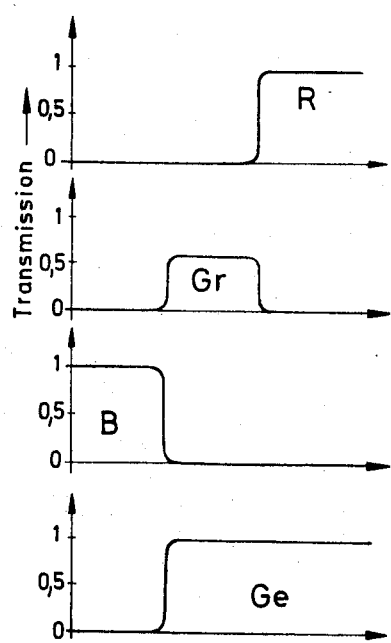
FIG. 2 is a diagrammatic view graphically illustrating the light permeability and transparency of the filter strips used in the embodiment of FIG. 1.

Referring first to FIGS. 1 and 2, an objective has front and rear parts 1a and 1b which form a real image of an object located forwardly of lens part 1a on a photosensitive surface 2 provided on a black and white film having very high resolution and good modulation transmission. A lenticular grating 3 has a planar surface in direct contact with the photosensitive layer 2, and consisting of lens elements 3a and 3b which are cylinder lenses having such a power of refraction that a set 4 of filter strips is sharply and accurately imaged on the photosensitive layer 2. The lenticular grating 3 has, for example, 60 lens elements per millimeter, and this fine pitch favorably influences the quality of the picture.

Objective 1a, 1b has a plane of symmetry passing through the optical axis and being parallel to the axes of the lens elements 3a, 3b. The set of filter strips 4 consists of four pairs of filter strips, namely an innermost pair of filter strips 4b, which define between each other a strip-shaped area 4a, and further pairs of filter strips 4a, 4d, and 4e, the filter strips of each pair being arranged symmetrical to the plane of symmetry and parallel to each other. The area or strip 4a is permeable for all three color components, and is flanked by two very narrow yellow filter strips 4b which, as is apparent from FIG. 2, completely absorb the color component blue. A pair of filter strips 4c is associated with the color component red, and since the central strip 4a, and the yellow filter strips 4b are also permeable for red light, the cylinder lens 3a images a continuous red stripe symmetrical to the axis of the cylinder lens 3a, and shown as part of the graph 5 in FIG. 1, while the permeability for the red light is indicated in the uppermost portion of FIG. 2.

Outwardly and adjacent of the red filter strips 4c, blue filter strips 4d are provided whose width is selected so that the blue stripe adjacent the red stripe has a width which is only one-third of the width of the red stripe imaged by the lens element 3a, as is apparent from the graph 6 in FIG. 1. The outwardly following green filter strips 4e have a light transmission of 0.5, as indicated at Gr in FIG. 2 which is half the light transmission of the other color components. This lower light transmission is selected because in the arrangement of FIG. 1, the green stripes imaged by adjacent lens elements 3a, 3b are superimposed on each other so that the two images together result in sufficient intensity of the green color component.

The same effect could be obtained if each of two adjacent lens elements 3a, 3b would image a green stripe of only half the width of the illustrated green stripe, but having full intensity, provided that the two green stripes of adjacent lens elements are directly adjacent each other. In both cases, the graph 7 represents the distribution of the images of the green filter strips.

All images of the strips 4 formed by all lens elements of the lenticular grating 3, form on the photosensitive surface 2, a strip grating. When the film is exposed, the brightness values of the object imaged by the objective 1a, 1b are superimposed on the colored strip grating so that the same is correspondingly modulated. After exposure of the photosensitive layer of film 2, the same is separated from the lenticular grating 3 and developed in the usual manner, so that a black and white picture appears on the photosensitive surface. In addition, three superimposed strip gratings extending in the same direction are visible on the film.

The manner in which the three color informations with the associated color values are reproduced is disclosed in our copending application Ser. No. 803,676, and will be briefly described with reference to FIG. 5. A source of light 8, which should be as small and point-shaped as possible, is imaged by a condenser 9 on an intermediate diaphragm 10 which has two diametrically spaced openings. The developed film 11 having the photosensitive surface 2 with images as described above, is placed directly behind condenser 9, and is imaged on a screen 13 by an objective 12 which is arranged as closely as possible to the diaphragm 10. The image of the lamp 8 is projected by condenser 9 into the plane of diaphragm 10. Outside of the place of a direct image, which may be described as the zero diffraction order, concentrations of light, the so-called higher diffraction orders, are formed at different points of the plane of the diaphragm 10, depending on the fineness and direction of the strip grating on the photosensitive surface of film 11. If the grating is strictly sinusoidal, only the first diffraction order is produced, while gratings having harmonic characteristics of the higher order, cause diffraction phenomena of the higher orders.

The radial deviation of the diffraction from the optical axis is determined by the fineness of the grating, and by the angular position of the diffraction brightness in relation to the azimuthal position of the grating. By selecting the grating constant and angle, it can be determined where the respective diffraction order occurs in the plane of the diaphragm. Therefore, it is convenient to refer to a local frequency spectrum, while the grating effects the transfer of information regarding the picture in the manner of a carrier frequency.

Since the diaphragm 10 has an impermeable central portion, a direct image of the source of light in the plane of the diaphragm is blocked, while the rays of the higher diffraction orders are projected through the corresponding openings in the outer portions of diaphragm 10 through objective 12 onto screen 13. In this manner, a picture of the object imaged on the photosensitive surface of film 11 is formed on screen 13 only by rays produced by diffraction phenomena.

Since by the grating constant of the several gratings associated with different color components, the angular deflection from the optical axis, or the radius of the mean deviation is determined, the position of the light concentration of every color component, and of every diffraction order in the intermediate diaphragm plane is determined. Therefore, the diaphragm plane may be referred to as selection plane for the local frequency. By arranging of color filter strips of the respective color at these points, the result can be obtained that only light pertaining to the respective color component reaches the objective 12 and is projected onto screen 13 on which the color picture composed of the color components is formed.

Figure 3:
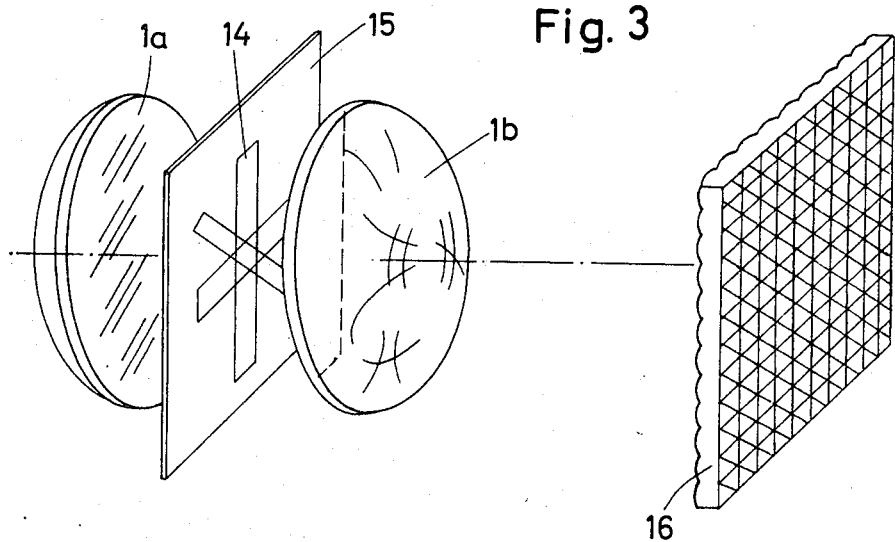
FIG. 3 is a fragmentary schematic perspective exploded view illustrating a second embodiment of the invention in which the filter strips are angularly displaced.
Figure 4:
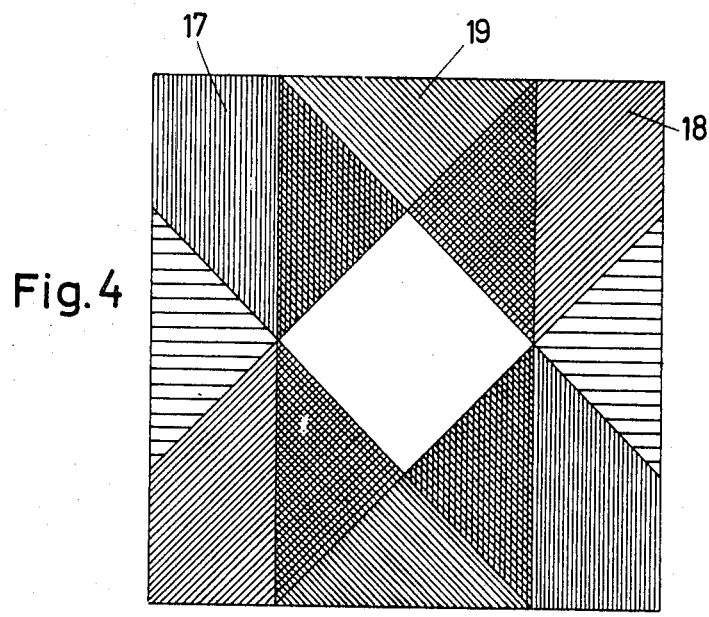
FIG. 4 is a view illustrating the positions of the filter strips in the embodiment of FIG. 3.

In the embodiment of FIGS. 3 and 4, the objective also consists of front and rear portions 1a and 1b between which a set of strips 14 is disposed in the objective plane 15. A lenticular grating consisting of perpendicularly crossing rows of spherical lens elements is provided in the front of a photosensitive surface, not shown, as described with reference to FIG. 1. As in the embodiment of FIG. 1, objective 1a, 1b forms a black and white image on the photosensitive surface, while the set of filter strips 14 is imaged by each lens element of the lenticular grating 16 on the corresponding square area of the photosensitive surface so that a strip grating is exposed and recorded on the photosensitive surface. FIG. 3 shows schematically that three filter strips associated with three color components cross each other in the optical axis of objective 1a and 1b. FIG. 4 more clearly shows that the set of filter strips 14 includes a diagonally extending filter strip 17 permeable for green light, and another diagonal filter strip 18 permeable for blue light and crossing filter strip 17 at right angles. A third filter strip 19 extends at an angle of 45° to the green and blue filter strips 17 and 18, and is permeable for red light. Filter strips 17 and 18 have the same width, and the filter strip 19 has a greater width which is $\sqrt{2}$ times the width of filter strips 17 and 18. The color components occur only where there are no strip portions superimposed. Where the red and blue strips overlap, the filter color is purple, where the green and red strips overlap, the filter color is yellow, and in the central square in which all three strips 17, 18, 19 overlap, all colors can pass through the filters. The outer ends of filter strips 17, 18, 19 are shaped so that the entire set of filter strips has a square area. When this square area is imaged by each of the lens elements of the lenticular grating 16 on a photosensitive surface, corresponding square areas of the same receive images which together form a strip grating on the entire photosensitive surface since the imaged square areas are directly adjacent each other. The photosensitive surface has thus the image of three color-modulated strip gratings slanted at the same angles as the filter strips 17, 18 and 19.

The lenticular grating 16 which is composed of crossing rows of square spherical lenses can be made by a stamping operation of synthetic plastic material. It is also possible to produce the lenticular grating by a photographic process. As has been found by tests, the quality of reproductions obtained by photographically made lenticular gratings is sufficient for the purpose of the invention. Lenticular grating made by a photographic process can be made to a very fine pitch which is advantageous since the area of each image picture element must conform to the size of the respective lens element so that a lenticular grating having a fine pitch is required for high-quality reproductions.

Figure 5:
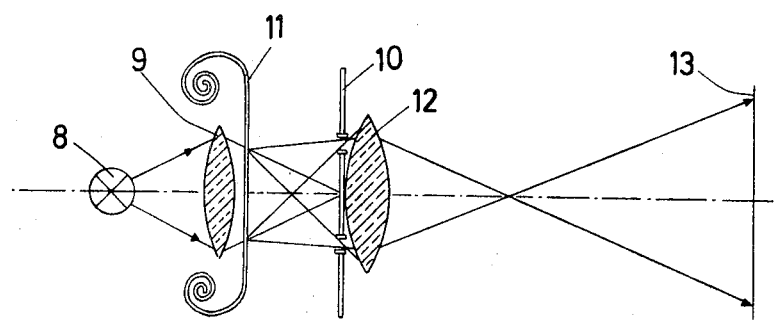
FIG. 5 is a fragmentary schematic view illustrating an apparatus for reproducing pictures made in accordance with the embodiments of FIGS. 1–4.
Figure 6:
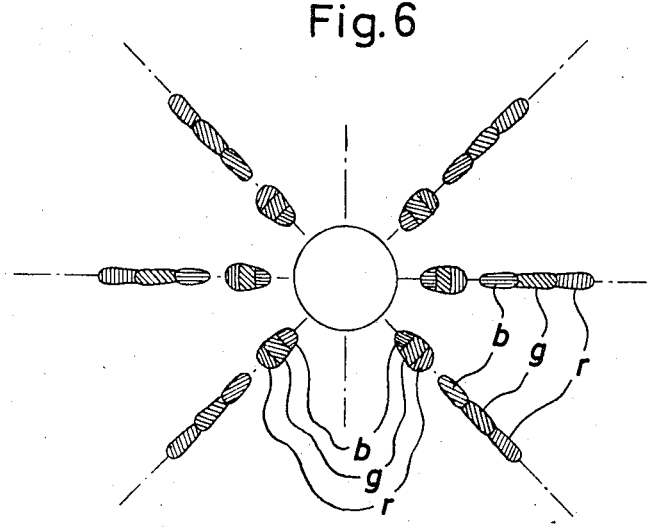
FIG. 6 is a schematic view illustrating the distribution of the color components in the diaphragm plane of FIG. 5.

For obtaining a colored picture of a photosensitive layer exposed by the apparatus of FIG. 3, the apparatus described with reference to FIG. 5 can be used. As illustrated in FIG. 6, successive brightness concentrations occur at different angles in the diaphragm plane 10, which are respectively correlated with one of the three color components. The angles between the brightness concentrations correspond to azimuthal angular positions of the diffraction gratings. At each of the brightness concentrations, in a direction from the center outward, the color components blue, green and red with the known intermediate colors occur at the first diffraction order, and are repeated in the second diffraction order. This affords the possibility to arrange a diaphragm in this plane which permits passage of the color which is correct for the reproduction of the respective color component, but absorbs the remaining colors. In the plane of the picture screen 13, the objective 12 forms a picture combining the three color components. A particular advantage of the arrangement is that by adjusting the apertures of the diaphragm, or by neutral filters, the color components can be balanced.

The reproduction of the black and white pictures recorded in accordance with the invention, can be carried out by other arrangements and holographic methods, and is not an object of the present invention.

Instead of exposing on the photosensitive layers three color component images, as described above, it is also possible to expose different black and white images on the photosensitive surface. A grating having a variable grating constant is used for each exposure, or the grating may have different azimuthal angular positions during each exposure. A gap in the plane of the objective is imaged in different positions by each lens element of the lenticular grating so that different gratings are superimposed on each black and white image, or the angular position of the gap in the plane of the objective is placed in a different angular position during each exposure, corresponding to the method applied in the embodiment of FIGS. 1 and 3, respectively. The separation of the three black and white pictures during the reproduction is effected, as described with reference to FIG. 5, by apertures in the diaphragm 10, and by the respective diffraction orders.

It will be understood that each of the elements described above, or two or more together, may also find a useful application in other types of arrangements for photographic color recording differing from the types described above.

While the invention has been illustrated and described as embodied in a method and apparatus for photographic recording on a black and white film in such a manner that color reproduction can be obtained, it is not intended to be limited to the details shown, since various modifications and structural changes may be made without departing in any way from the spirit of the present invention.

What is claimed as new and desired to be protected by Letters Patent is set forth in the appended claims.

1. Apparatus for photographic color recording, comprising an objective for forming an image on a photosensitive surface and having an optical axis; a set of different filter strips associated with different color components for selectively filtering image-forming rays passing through said objective, said strips being angularly spaced about said optical axis and being superimposed in a central area permeable to all color components of light, portions of only a pair of different strips being superimposed outside of said central area and being permeable to the two color components of the respective pair of different strips; and a lenticular grating located between said objective and said photosensitive surface and covering the latter, said grating including a plurality of lens elements for respectively projecting the filtered rays associated with different color components onto correlated areas of said photosensitive surface so that each lens element forms an image of said set of filter strips on the respective area whereby all images of said strips form a strip grating on the entire photosensitive surface, the image formed by said objective on said photosensitive surface being reproducible by the diffraction orders of said strip grating.

2. Apparatus as claimed in claim 1 wherein said objective has a front part and a rear part and an objective plane between the same; and wherein said filter strips are located in said objective plane.

3. Apparatus as claimed in claim 1 wherein filter strips associated with different color components have different widths.

4. Apparatus as claimed in claim 1 wherein filter strips associated with different color components have different angular positions.

5. Apparatus for photographic color recording, comprising an objective for forming an image on a photosensitive surface and having an optical axis and a plane of symmetry passing through said axis; a set of different filter strips associated with different color components for selectively filtering image-forming rays passing through said objective, said strips including pairs of filter strips and each pair of such filter strips being associated with a different color component, the filter strips of each of said pairs being disposed on opposite sides of said plane of symmetry and being symmetrical to the same; and a lenticular grating located between said objective and said photosensitive surface and covering the latter, said grating including a plurality of lens elements for projecting the filtered rays associated with different color components onto correlated areas of said photosensitive surface, respectively, so that each lens element forms an image of said set of filter strips on the respective area whereby all images of said strips form a strip grating on the entire photosensitive surface, the image formed by said objective on said photosensitive surface being reproducible as a color picture by the diffraction orders of said strip grating.

6. Apparatus as claimed in claim 5 wherein a first pair of filter strips impermeable to a first color component is located on opposite sides of a strip-shaped area permeable to all color components; wherein a second pair of strips permeable to a second color component is located outside of said first pair of strips; wherein a third pair of strips permeable for the first color component is located outside of said third pair; and wherein a fourth pair of strips permeable for a third color component is located outside of said third pair of strips.

7. Apparatus as claimed in claim 6 wherein said first pair of strips has narrow yellow strips impermeable for blue; wherein said second pair of strips is permeable for red; wherein said third pair of strips is permeable for blue; wherein said fourth pair of strips is permeable for green.

8. Apparatus as claimed in claim 6 wherein said strips are parallel and form on opposite sides of said plane of symmetry two groups of adjacent strips; wherein said strips of each pair have the same width, and strips of different pairs have different widths so that the colored images formed by said lens elements of the strips of said first, second and third pairs of strips have widths in the ratio of 1:2:3.

9. Apparatus as claimed in claim 8 wherein said lens elements of said lenticular grating are cylinder lenses having axes parallel to said plane of symmetry and to said strips.

10. Apparatus as claimed in claim 6 wherein the strips of said fourth pair of strips of each lens element have such a width and position that the images thereof are superimposed on the images of the strips of the fourth pairs of strips formed by the adjacent lens elements; and wherein said strips of said fourth pairs of strips transmit half the amount of light transmitted by the other strips so that the superimposed images have the same brightness as the images formed by said other strips.

11. Apparatus as claimed in claim 6 wherein the strips of said fourth pair of strips of each lens element have such a width and positions that the images thereof are located directly adjacent to the strips of the fourth pairs of strips formed by adjacent lens elements.

12. Apparatus for photographic color recording, comprising an objective for forming an image on a photosensitive surface and having an optical axis; a set of different filter strips associated with different color components for selectively filtering image-forming rays passing through said objective, said strips being angularly spaced about said optical axis and being superimposed in a central area permeable to all color components of light, portions of two different strips being superimposed and permeable to the respective two color components, two of said strips having the same width, being associated with two different color components and being disposed perpendicularly to each other, a further strip associated with a third color component defining an angle of 45° with said two strips of the same width and having a width $\sqrt{2}$ times greater than the width of said two strips having the same width; and a lenticular grating located between said objective and said photosensitive surface and covering the latter, said grating including a plurality of lens elements for projecting the filtered rays associated with different color components onto correlated areas of said photosensitive surface, respectively, so that each lens element forms an image of said set of filter strips on the respective area whereby all images of said strips form a strip grating on the entire photosensitive surface, the image formed by said objective on said photosensitive surface being reproducible as a color picture by the diffraction orders of said strip grating.

13. Apparatus for photographic color recording, comprising an objective for forming an image on a photosensitive surface and having an optical axis; a set of different filter strips associated with different color components for selectively filtering image-forming rays passing through said objective, said strips being angularly spaced about said optical axis and being superimposed in a central area permeable to all color components of light, portions of two different strips being superimposed and permeable for the respective two color components and said angularly spaced strips being located within a square area; and a lenticular grating located between said objective and said photosensitive surface and covering the laxter, said grating including a plurality of lens elements for projecting the filtered rays associated with different color components onto correlated areas of said photosensitive surface, respectively, so that each lens element forms an image of said set of filter strips on the respective area whereby all images of said strips form a strip grating on the entire photosensitive surface, the image formed by said objective on said photosensitive surface being reproducible as a color picture by the diffraction orders of said strip grating, said lens elements of said lenticular grating being spherical lenses arranged in perpendicularly crossing rows to image said angularly spaced strips on corresponding square areas of said photosensitive surface.

14. Apparatus for photographic color recording, comprising an objective for forming an image on a photosensitive surface and having an optical axis; a set of different filter strips associated with different color components for selectively filtering image-forming rays passing through said objective, said strips being angularly spaced about said optical axis and being superimposed in a central area permeable to all color components of light, portions of two different strips being superimposed and permeable to the respective two color components, two strips having the same width, being associated with green and blue, respectively, and being disposed perpendicularly to each other, a third strip associated with red defining an angle of 45° with said two strips of the same width and being superimposed on portions of the same, said third strip having a width greater than the width of said two strips of the same width and all said strips being superimposed in the region of said axis to form a square central area permeable to all color components of light; and a lenticular grating located between said objective and said photosensitive surface and covering the latter, said grating including a plurality of lens elements for projecting the filtered rays associated with different color components onto correlated areas of said photosensitive surface, respectively, so that each lens element forms an image of said set of filter strips on the respective area whereby all images of said strips form a strip grating on the entire photosensitive surface, the image formed by said objective on said photosensitive surface being reproducible as a color picture by the diffraction orders of said strip grating.

* * * * *